(12) United States Patent
Beavin et al.

(10) Patent No.: US 6,980,981 B2
(45) Date of Patent: Dec. 27, 2005

(54) METHOD, SYSTEM, AND PROGRAM FOR SELECTING A JOIN ORDER FOR TABLES SUBJECT TO A JOIN OPERATION

(75) Inventors: Thomas Abel Beavin, Milpitas, CA (US); You-Chin Fuh, San Jose, CA (US); Joseph F. Sinnott, Jr., Palo Alto, CA (US)

(73) Assignee: International Business Machines Corporation, Armonk, NY (US)

( * ) Notice: Subject to any disclaimer, the term of this patent is extended or adjusted under 35 U.S.C. 154(b) by 335 days.

(21) Appl. No.: 10/143,410

(22) Filed: May 10, 2002

(65) Prior Publication Data

US 2003/0212701 A1 Nov. 13, 2003

(51) Int. Cl.$^7$ ............................................. G06F 17/30
(52) U.S. Cl. ...................... 707/2; 707/3; 707/7; 707/8; 707/101; 707/102
(58) Field of Search .................... 707/1–10, 100–104.1, 707/200–206

(56) References Cited

U.S. PATENT DOCUMENTS

| | | | | |
|---|---|---|---|---|
| 5,301,317 A | | 4/1994 | Lohman et al. ................. | 707/2 |
| 5,335,345 A | | 8/1994 | Frieder et al. .................. | 707/5 |
| 5,600,829 A | * | 2/1997 | Tsatalos et al. ................. | 707/2 |
| 5,870,747 A | * | 2/1999 | Sundaresan .................... | 707/101 |
| 6,009,265 A | | 12/1999 | Huang et al. ................... | 707/3 |
| 6,240,427 B1 | * | 5/2001 | Szalwinski et al. ......... | 707/204 |
| 6,330,552 B1 | | 12/2001 | Farrar et al. .................... | 707/1 |
| 6,353,818 B1 | | 3/2002 | Carino, Jr. ...................... | 707/4 |

OTHER PUBLICATIONS

U.S. Appl. No. 09/340,084, filed Jun. 25, 1999, entitled "Method, System, and Program for Determining the Join Order of Tables in a Join Query", inventors L–C.H. Liu, et al., now patented P.N. 06,397,204.

A. Swami, "Optimization of Large Join Queries", ACM 0–89791–268–3/88/0066/0008, 1988, pp. 8–18.

A. Swami, "Optimization of Large Join Queries: Combining Heuristics and Combinatorial Techniques", ACM0–89791–317–5/89/0005/0367, 1989, pp. 367–376.

S. Gangley, et al., "Query Optimization for Parallel Execution", Rpt. No. HPL–92–93, Mar. 1992, pp22 (abstract).

M. Matysiak, "Efficient Optimization of Large Join Queries Using Tabu Search", Information Sciences, vol. 83, No. 1–2, Mar. 1995, pp. 77–88 (abstract).

U.J. Langer, et al., "Join Sequence Optimization in Parallel Query Plans", Proceedings 7$^{th}$ Intl. workshop on Database and Expert Systems Application, 1996, pp. 506–513 (abstract).

(Continued)

Primary Examiner—Jean M. Corrielus
Assistant Examiner—Isaac M. Woo
(74) Attorney, Agent, or Firm—David W. Victor; Konrad Raynes & Victor LLP (57) ABSTRACT

Provided are a method, system, and program for selecting a join order for tables subject to a join operation. An estimation is made of a join cost to perform joins on permutations of at least two of the tables, wherein each join permutation indicates an order of joining the tables. A determination is made as to whether sufficient computational resources are available to perform a join cost analysis of further join permutations of the tables. If sufficient computational resources are not available, then a determination is made of a restricted subset of remaining join permutations of at least two of the tables for which join costs have not been estimated that is less than all the remaining join permutations. The join costs of permutations of tables in the restricted subset is estimated and the estimated join costs are used to select one join permutation of all the tables having a lowest estimated join cost.

39 Claims, 5 Drawing Sheets

OTHER PUBLICATIONS

B. Vance, et al., "Rapid Bushy Join–Order Optimization with Cartesian Products", SIGMOD Record, vol. 25, No. 2, Jun. 1996, pp. 35–46 (abstract).

K. Aberer, et al., "Rule–Based Generation of Logical Query Plans with Controlled Complexity", Proceedings 5th Intl. Conference on Deductive and Object–Oriented Databases, 1997, pp. 399–416, (abstract).

L.M. Haas, et al., "Seeking the Truth About Ad Hoc Join Costs", VLDB Journal, vol. 6, No. 3, Aug. 1997, pp. 241–256 (abstract).

S. Morishita, "Avoiding Cartesian Products for Multiple Joins", Journal of the ACM, vol. 44, No. 1, Jan. 1997, pp. 57–85 (abstract).

W. Scheufele, et al., "Efficient Dynamic Programming Algorithms for Ordering Expensive Joins and Selections", Proceedings 6th Intl. Conference on Extending Database technology, 1998, pp. 201–215 (abstract).

F. Carino, et al., "Plan–Per–Tuple Optimization Solution–Parallel Execution of Expensive User–Defined Functions", Proceedings of the 24th Intl. Conference on Very–Large Databases, 1998, pp. 690–695 (abstract).

T. Lahiri, "Genetic Optimization Techniques for Large Join Queries", Proceedings of 3rd Annual Conference on Genetic Programming, 1998, pp. 535–542 (abstract).

K. Ono, et al., "Measuring the Complexity of Join Enumeration in Query Optimization", 16th Intl. Conference on Very Large Data Bases, 1990, pp. 314–325 (abstract).

L. Popa, et al., "A Chase Too Far? Query Optimzation", SIGMOD Record, vol. 29, No. 2, Jun. 2000, pp. 273–284 (abstract).

I.T. Bowman, et al., "Join Enumeration in a Memory–Constrained Environment", Proceedings of 16th Intl. Conference on Data Engineering, 2000, pp. 645–654 (abstract).

Sousa, J.M., M. Setnes, and U. Kaymak, "Adaptive Decision Alternatives in Fuzzy Predictive Control", *Fuzzy Systems Proceedings, 1998. IEEE World Congress on Computational Intelligence., The 1998 IEEE International Conference on.* May 4–9, 1998, vol. 1, pp. 698–703.

* cited by examiner

METHOD, SYSTEM, AND PROGRAM FOR SELECTING A JOIN ORDER FOR TABLES SUBJECT TO A JOIN OPERATION

BACKGROUND OF THE INVENTION

1. Field of the Invention

The present invention relates to a method, system, and program for selecting a join order for tables subject to a join operation.

2. Description of the Related Art

Data records in a relational database management system (RDBMS) in a computer are maintained in tables, which are a collection of rows all having the same columns. Each column maintains information on a particular type of data for the data records which comprise the rows. Tables in the database are searched using a Structured Query Language (SQL), which specifies search operations or predicates to perform on columns of tables in the database to qualify rows in the database tables that satisfy the search conditions. An SQL join operation involves a query that is performed on combinations of rows from a plurality of tables. Conceptually, when executing a join operation on a plurality of tables, the database engine forms all possible combinations of rows from the table. The database engine then applies the search condition to all the combinations of rows from the join tables. In a join query, a search condition or join condition specifies some relationship between the rows to be joined. One challenge in performing a join query on multiple tables is to select the order in which the tables will be joined when applying the search criteria, i.e., the order in which the rows of the table are joined.

Many database engines utilize optimization techniques to select the best possible join ordering for queries in relational database systems. The order in which the joins are performed has a substantial impact on query performance. The desired query execution plan consists of an ordered series of primitive database operators and is typically developed by choosing the plan having the least estimated execution cost from among several alternative plans making up a "search space". A search space embraces a number of query execution plans that are limited according to the type and sequence of the primitive database operators allowed in the plans. Since only two-way join operators are usually provided as primitives, an optimizer is normally obliged to select the "best" sequence of two-way joins to achieve the N-way join of data tables requested by a non-procedural user query.

The computational complexity of the optimization process and the execution efficiency of the plan chosen by that process are dominated by the number of such possible primitive operator sequences that must be evaluated by the optimizer. That is, they are dominated by the size of the "search space" spanned by the query optimizer. An exhaustive enumeration is clearly exponential in the number of tables and hence is impractical for all but trivial queries. Thus, some scheme for limiting the search space must be provided to any query optimizer. The commonly assigned U.S. Pat. No. 5,301,317, entitled "System for Adapting Query Optimization Effort to Expected Execution Time," which is incorporated herein by reference in its entirety includes further discussion of how the search space may be reduced to limit the cost of the query optimization process and dynamic programming techniques to optimize query evaluation plans.

Certain prior art query optimizers will switch to a heuristic approach if the number of tables in the join query exceeds a predetermined threshold. The reason for such switching is to limit the computational resources, e.g., memory, storage, processor cycles, expended on the query optimization process. To conserve computational resources, the query optimizer may use a greedy algorithm as the heuristic approach in the event when there are too many tables. One such prior art greedy approach is to use the smallest table, which is the table having the least number of rows, as the first table in the ordering and then determine the cost of different join orders with the smallest table first. The next smallest tables may be placed in subsequent positions in the join order when determining the cost of the different join orderings, such that the cost is considered with respect to different possible orders having some number of smallest tables in the initial order positions.

One common query evaluation plan is to use dynamic programming algorithms, which often are difficult to infeasible or extremely consuming to process if many tables, e.g., ten tables or more, are involved in the join operation. The article entitled "Optimization of Large Join Queries: Combining Heuristics and Combinatorial Techniques," by Arun Swami, in the ACM SIGMOD Record Vol. 18, No. 2, pgs. 367–367 by the Association for Computing Machinery (ACM Copyright 1989), discusses problems with dynamic programming query evaluation techniques as the number of tables involved in the query exceeds ten. This article is incorporated herein by reference in its entirety.

Notwithstanding current query optimization techniques, there is a continued need in the art for improved query optimization techniques.

SUMMARY OF THE PREFERRED EMBODIMENTS

Provided are a method, system, and program for selecting a join order for tables subject to a join operation. An estimation is made of a join cost to perform joins on permutations of at least two of the tables, wherein each join permutation indicates an order of joining the tables. A determination is made as to whether sufficient computational resources are available to perform a join cost analysis of further join permutations of the tables. If sufficient computational resources are not available, then a determination is made of a restricted subset of remaining join permutations of at least two of the tables for which join costs have not been estimated that is less than all the remaining join permutations. The join costs of permutations of tables in the restricted subset is estimated and the estimated join costs are used to select one join permutation of all the tables having a lowest estimated join cost.

In further implementations, estimating the join cost with respect to permutations of the tables further comprises monitoring resources consumed when estimating the join costs; reducing a remaining resource budget by the monitored resources consumed; estimating future resources needed to estimate the join costs on remaining join permutations; and determining whether the future resources exceeds the remaining resource budget, wherein sufficient computational resources are not available if the estimated future resources exceeds the remaining resource budget.

In still further implementations, the join costs are estimated in iterations, and the steps of monitoring resources and determining whether resources consumed exceeds the resource budget occur during each iteration.

In yet further implementations, during each iteration following the first iteration, a determination is made of join permutations formed by combining the join permutations considered in a previous iteration and the tables, wherein the join costs are estimated with respect to the determined join permutations.

Still further, determining the restricted subset during each iteration may comprise selecting less than all of the join permutations considered in the previous iteration and using the selected join permutations considered in the previous iteration to form the determined join permutations.

The described implementations provide improved techniques to determine a least cost join order within a computational resource budget, where the number of join orders considered in the cost analysis is adjusted based on an estimation of remaining computational resources available for the join cost analysis.

BRIEF DESCRIPTION OF THE DRAWINGS

Referring now to the drawings in which like reference numbers represent corresponding parts throughout.

DETAILED DESCRIPTION OF THE PREFERRED EMBODIMENTS

In the following description, reference is made to the accompanying drawings which form a part hereof and which illustrate several embodiments of the present invention. It is understood that other embodiments may be utilized and structural and operational changes may be made without departing from the scope of the present invention.

Figure 1:
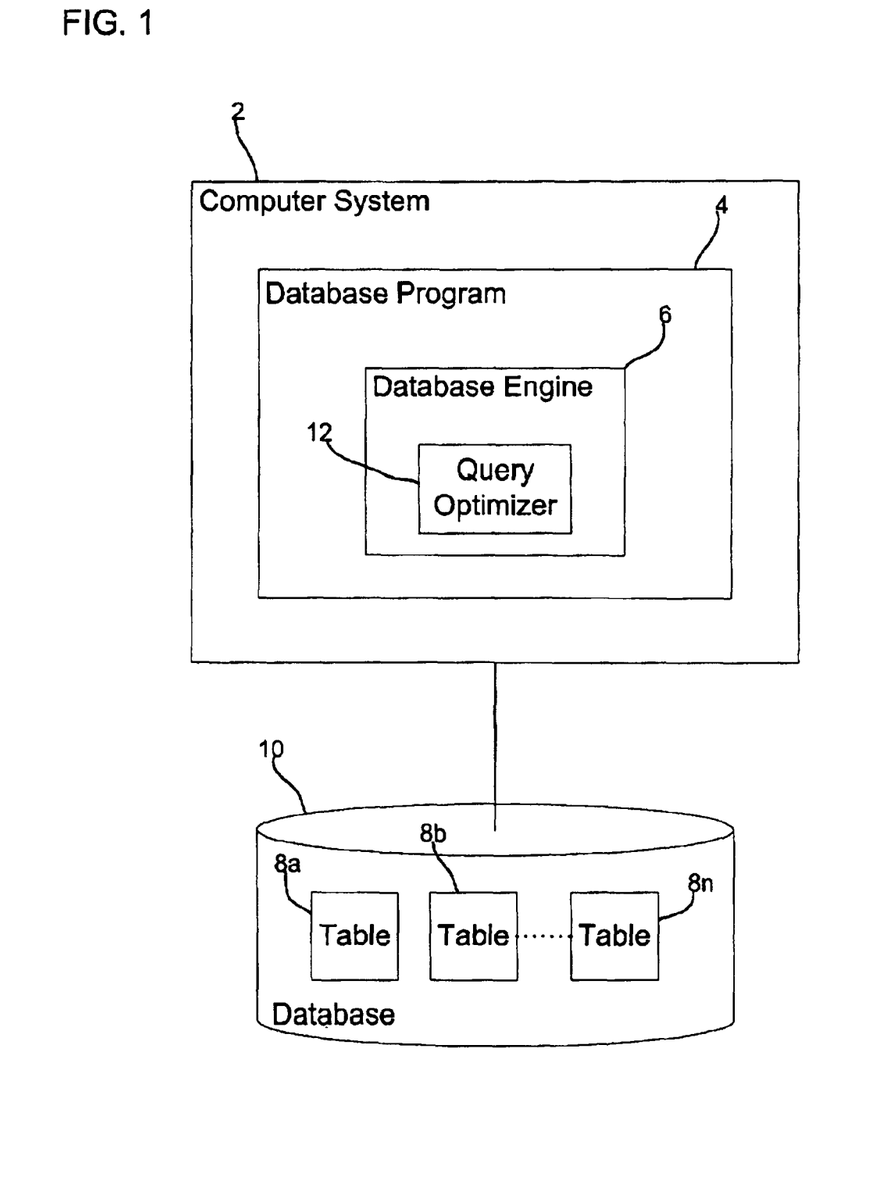
FIG. 1 illustrates a computing environment in which aspects of the invention are implemented.

FIG. 1 illustrates a computing environment in which aspects of the invention are implemented. A computer system 2, which may comprise any computational device known in the art (e.g., a workstation, personal computer, mainframe, server, laptop, hand held computer, telephony device, network appliance, etc.) includes a database program 4, such as any database program known in the art, e.g., International Business Machines Corporation's DB2®, etc. The database program 4 has a database engine 6 that executes queries against one or more tables 8a, 8b . . . 8n in a database 10 in a manner known in the art. The database 10 may be maintained in a storage device (not shown), such as any non-volatile storage device known in the art. Further, the database engine 6 includes a query optimizer 12 to determine a join order of tables 8a, 8b . . . 8n specified in an SQL join operation in accordance with implementations of the invention.

The query optimizer 12 would analyze the cost of different join orders of the tables 8a, 8b . . . 8n subject to the join operation to estimate the least costly join order. In certain implementations, the query optimizer 12 would implement a modification of certain dynamic programming algorithms for estimating the cost of possible join orders. This algorithm enumerates the search space by first estimating the cost of all possible permutations of 2-way joins, or some subset thereof, for each of N tables. Iterations of i-way joins would be performed for i equals 3 to N. In dynamic programming algorithms known in the art, for each iteration for an i-way join, some or all of the previously determined permutations of the (i–1)-way join would be combined with some or all of the (N–i) tables to form some or all possible permutations of the i-way join, whose join cost would be estimated. Thus, the join cost is estimated for some or all permutations of i-way joins, where i equals 2 through N. To determine the join cost of joining all N tables, the costs of each of the N–2 sub-join components that form the N-way join are combined in a manner known in the art to determine the total cost of joining permutations of N tables.

Figure 2:
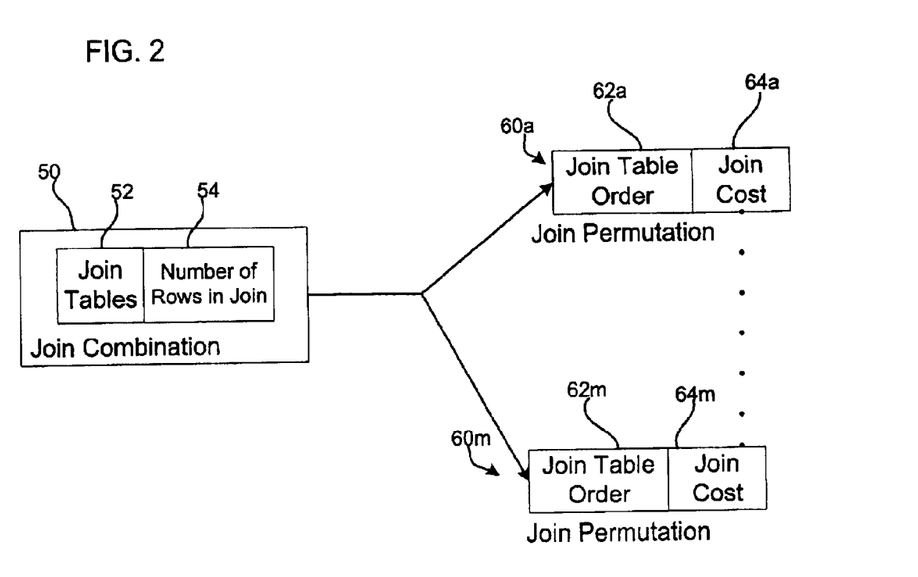
FIG. 2 illustrates data structure to store cost information on different join permutations in accordance with implementations of the invention.

FIG. 2 illustrates data structures that are used to store cost information for each i-way join. At each iteration, the query optimizer 12 would determine from the N tables each possible combination of tables that may be used in i-way joins. The query optimizer 12 would generate for each combination of the i-way join, a join combination structure 50 that indicates in a join tables field 52 the i tables in a combination being considered. For each join combination, one join permutation structure 60a . . . 60m is generated for each of the m permutations of the i tables in field 52. The number of rows field 54 indicates the number of rows that results from joining all rows of the tables indicated in the join tables field 52. Each join permutation structure 60a . . . 60m includes a join table order 62 indicating the order of the i tables in the combination for that permutation and a cost structure 64 indicating the join cost in computational resources, e.g., processor cycles, memory usage, etc., to perform that particular join permutation. The combination structure 50 may include pointers or other references to the permutation structures 60a . . . 60m for that combination. In this way, at each iteration of analyzing the i-way joins, the query optimizer 12 generates a join combination structure 50 for each combination of i of the N tables considered in the i-way iteration and one join permutation structure 60 for each permutation of one combination of i tables, where each join permutation structure 60 indicates the cost of performing the join for such permutation. The query optimizer 12 may store these data structures shown in FIG. 2 generated during the iterations in a volatile or non-volatile memory.

Figure 3A:
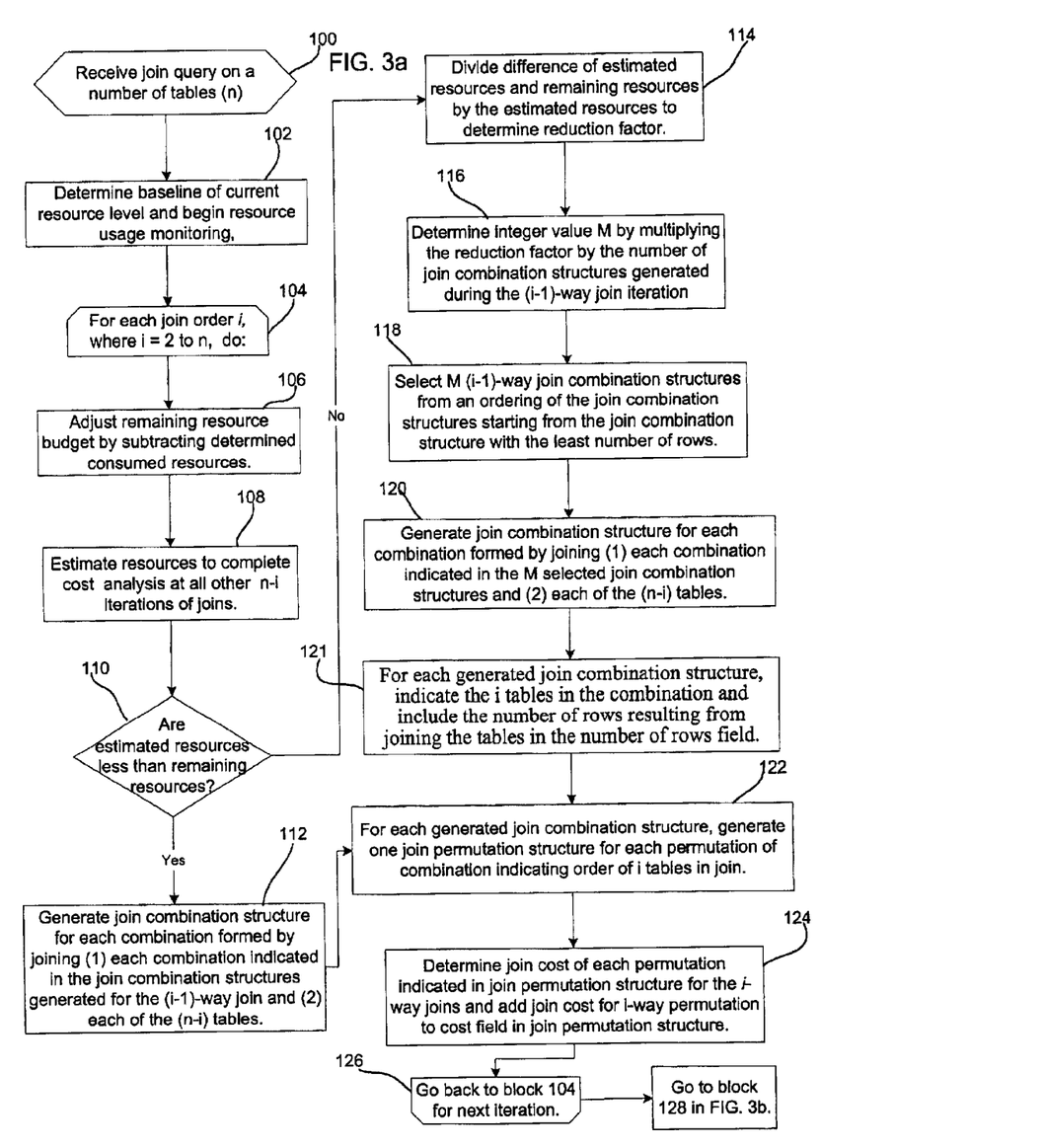
FIGS. 3a and 3b illustrate logic to select an optimal join order to join tables subject to a database join query in accordance with implementations of the invention.
Figure 3B:
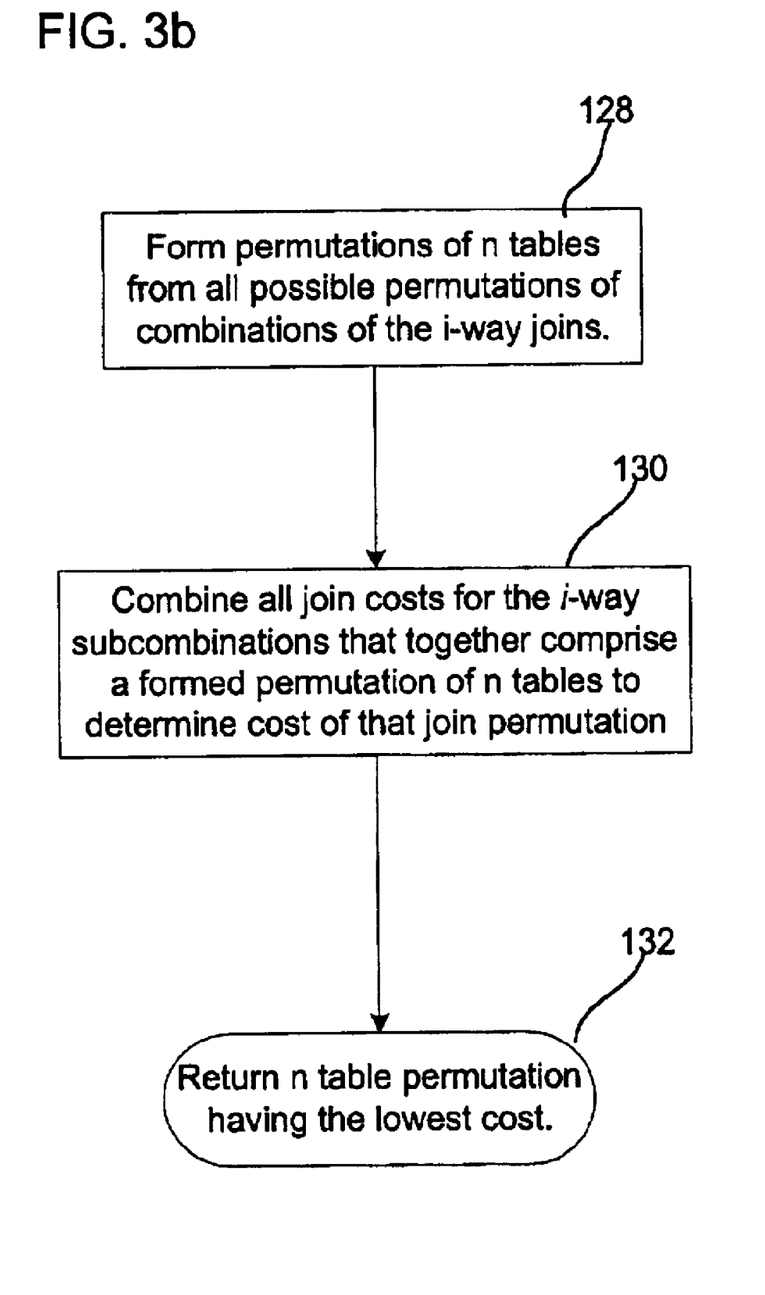

FIGS. 3a and 3b illustrate logic implemented in the query optimizer 12 to perform the query optimization to select a join order to join n tables. In certain implementations, the described implementation provide a modification of the dynamic programming technique for query optimization. Control begins at block 100 with the query optimizer 12 receiving an SQL query specifying a join operation on n tables. The query optimizer 12 determines (at block 102) current computational resource levels, such as current memory usage, processor cycles, etc. and begins monitoring resource usage. The query optimizer 12 performs a loop at blocks 102 to 126 for each iteration of i for i equals two through n (the number of tables subject to the i-th way join in the ith iteration). In each iteration i, the query optimizer performs cost estimation of certain permutations of an i-way join.

The query optimizer 12 would estimate the current resources available for query optimization by determining the amount of resources consumed since the baseline measurement of resource levels and subtracting (at block 106) the determined resource usage since the baseline measurement from the remaining resource budget, which is initially set to a predefined resource budget for performing the query optimization to select a join order. The query optimizer 12 would then estimate (at block 108) the resources needed to perform the remaining (n–i)-way join cost estimations on all remaining join permutations that could be considered. This estimation may be based on estimating the maximum number of permutations left to consider for the iterations for the (i+1) through n way joins, and then multiplying this maximum number of permutations times a predetermined resource cost per join, which may be empirically determined. Alternatively, the resources required to perform further join cost estimation may be based on some estimate of the remaining work needed to be performed. For instance, if i iterations have been performed, then the query optimizer 12 may assume that the percentage of work remaining is (n−i)/n and then use this percentage to estimate the number of joins to consider and the cost of considering such remaining number of join permutations. Alternative techniques may also be used to estimate the resources needed to estimate the cost of the joins in the remaining iterations.

The query optimizer 12 then determines (at block 110) whether the resources required to complete the cost analysis (determined at block 108) is less than the remaining resource budget (determined at block 106). If there are sufficient resources remaining, then the query optimizer 12 generates (at block 112) one join combination structure 50 for each combination of the n tables formed by joining (1) each combination indicated in the join combination structures 50 generated during the previous (i−1)th iteration and (2) each of the remaining (n−i) tables.

If (at block 110) the estimated remaining resources are estimated not to be sufficient to consider all possible permutations for the remaining iterations, then control proceeds to block 130 to reduce the search space of join permutations to consider. At block 130, the query optimizer 12 divides the difference of the estimated resources needed to complete all iterations (estimated at block 114) and the estimated remaining resources (estimated at block 108) by the estimated resources to complete all remaining iterations to determine a reduction factor. The query optimizer 12 then determines (at block 116) the number M of combinations of (i−1)-way joins from the previous iterations to use in forming the i-way joins in the current iteration by multiplying the reduction factor by the number of join combinations 50 generated during the previous (i−1)th iteration. For the first iteration when i equals two, the query optimizer 12 would just consider all n tables as the joins from the previous iteration, because a join has not yet been performed prior to the first iteration. In this way, this described implementations reduce the search space by reducing the number of (i−1)-way join combinations used in producing i-way joins considered in the current iteration. The query optimizer 12 then selects (at block 118) M (i−1)-way join combination structures generated during the previous (i−1)th iteration from an ordering of the join combination structures starting from the join combination structure with the least number of rows, as indicated in field 54. The query optimizer 12 would then generate (at block 120) join combination structures 50 for each combination formed by joining (1) each combination indicated in the M selected (i−1)-way join combination structures 50 and (2) each of the (n−i) tables. In alternative implementations, alternative techniques and considerations may be used to limit the number of join combinations considered in the previous iteration of (i−1)-way joins with tables in the current iteration to form i-way joins.

After generating the join combination structures at block 112 or 120, the query optimizer 12 then indicates (at block 121) the i tables in the join in field 52 and the number of rows resulting from the join in field 54. The number of rows may be the result of the Cartesian product of the tables. Additionally, if search predicates are provided for the join, then the number of rows may be those that satisfy the search predicates included in the SQL join statement. The query optimizer 12 then generates (at block 122) join permutation structures 60a . . . 60m for each permutation of the combination specified in field 52 in each join combination structure 50 generated at block 136. Each generated join permutation structure 60 would indicate the order of joining the i tables in the combination in field 62a . . . 62m. The query optimizer 12 would then determine (at block 124) the cost of performing the join indicated in each join permutation structure 60a . . . 60m generated at block 120 using join cost estimation techniques known in the art and then add the determined cost of the join for that permutation to the join cost field 64a . . . 64m of the join permutation structure 60 generated for that permutation. Control then proceeds (at block 126) back to block 104 if there are farther iterations to consider.

After performing the cost analysis for all iterations, the query optimizer 12 forms (at block 128) combines the permutations of the i-way joins to form as many permutations as possible of the n tables. The join cost of a permutation of n tables is determined (at block 130) as the sum of all join costs for the i-way subcombinations that together comprise a formed permutation of n tables. In this way, the join cost for a permutation of n tables would comprise the sum of the costs for all sub-join combinations that together form the n-way permutation, i.e., the cost of the 2-way, 3-way . . . . n-way joins that when together comprise the ordering of the join of the permutation being considered. The query optimizer 12 then returns (at block 132) the permutation of the n tables that has the lowest cost indicated in field 64.

With the described implementations, the query optimizer 12 would reduce the search space of join permutations at the beginning of each iteration following the first iteration if the estimated cost of performing the remaining iterations exceeds an estimated remaining resource budge. The described implementations thus reduce the search space by reducing the number of (i−1) way joins used in combination with the other (n−1) tables to form i-way joins. Further, in the described implementations, the search space is reduced only if a point is reached where the estimated remaining resources fall below the estimated resources needed to complete the cost analysis. In this way, the search space is reduced only at that point in the analysis where resource consumption has exceeded budgetary expectations.

With the described implementations, cost analysis can be applied to as many different join permutations as possible without exceeding budgetary constraints by adjusting the number of permutations considered.

Additional Implementation Details

The query optimization technique may be implemented as a method, apparatus or article of manufacture using standard programming and/or engineering techniques to produce software, firmware, hardware, or any combination thereof. The term "article of manufacture" as used herein refers to code or logic implemented in hardware logic (e.g., an integrated circuit chip, Programmable Gate Array (PGA), Application Specific Integrated Circuit (ASIC), etc.) or a computer readable medium, such as magnetic storage medium (e.g., hard disk drives, floppy disks,, tape, etc.), optical storage (CD-ROMs, optical disks, etc.), volatile and non-volatile memory devices (e.g., EEPROMs, ROMs, PROMs, RAMs, DRAMs, SRAMs, firmware, programmable logic, etc.). Code in the computer readable medium is accessed and executed by a processor. The code in which preferred embodiments are implemented may further be accessible through a transmission media or from a file server over a network. In such cases, the article of manufacture in which the code is implemented may comprise a transmission media, such as a network transmission line, wireless transmission media, signals propagating through space, radio waves, infrared signals, etc. Of course, those skilled in the art will recognize that many modifications may be made to this configuration without departing from the scope of the present invention, and that the article of manufacture may comprise any information bearing medium known in the art.

In FIG. 2, specific combination and permutation data structures were described for providing information on the different join orders analyzed. In alternative implementations, alternative data structure arrangements may be used, and additional information may be provided in the data structures providing information on the join combinations and permutations considered in the cost analysis.

The described implementations analyzed the resource usage during each iteration of considering the cost of i-way joins. In alternative implementation, the resource usage may be analyzed across iterations or within iterations after analyzing one or more joins within an iteration to allow for an even more rapid adjustment of the search space.

In the described implementations, the search space was reduced by selecting fewer of the (i–1)-way combinations considered in the previous iteration to use in forming i-way combinations during the current iteration. In alternative implementations, other techniques may be used to restrict the number of joins considered in the current and/or subsequent iterations, either by reducing the number of join combinations considered in a previous iteration of (i–1)-way joins or reducing the number of tables combined with the combinations from the previous iteration to form i-way joins.

The described implementations discussed modifications to dynamic programming algorithms. In alternative implementations, the described techniques for limiting the search space in considering the cost of different join orderings may be applied to query optimization algorithms that are not based on dynamic programming algorithms.

The illustrated logic of FIGS. 3a and 3b indicates certain events occurring in a certain order. In alternative implementations, certain operations may be performed in a different order, modified or removed. Morever, steps may be added to the above described logic and still conform to the described implementations. Further, operations described herein may occur sequentially or certain operations may be processed in parallel. Yet further, operations may be performed by a single processing unit or by distributed processing units.

Figure 4:
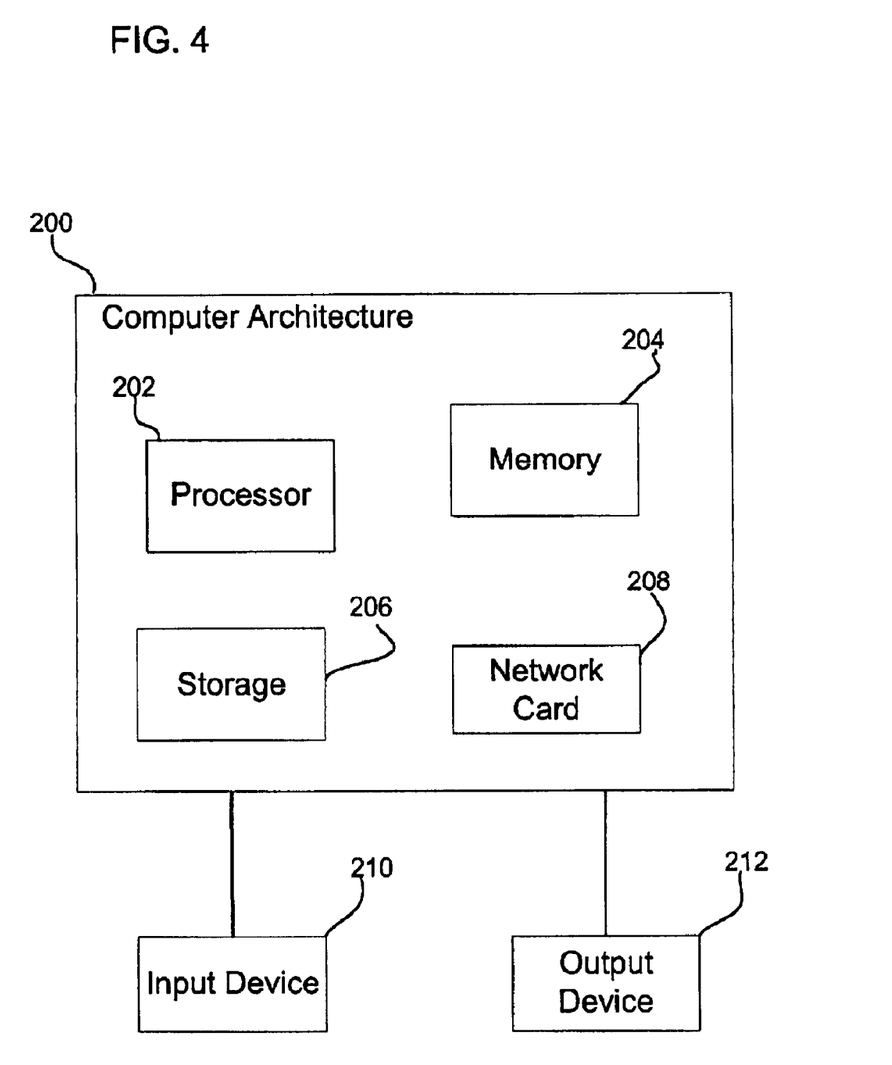
FIG. 4 illustrates a computing architecture that may be utilized with certain implementations of the invention.

FIG. 4 illustrates one implementation of the architecture of the computer system 2. The system 2 may implement a computer architecture 200 having a processor 202 (e.g., a microprocessor), a memory 204 (e.g., a volatile memory device), and storage 206 (e.g., a non-volatile storage, such as magnetic disk drives, optical disk drives, a tape drive, etc.). The storage 206 may comprise an internal storage device or an attached or network accessible storage. Programs in the storage 206 are loaded into the memory 204 and executed by the processor 202 in a manner known in the art. The architecture further includes a network card 208 to enable communication with a network. An input device 210 is used to provide user input to the processor 202, and may include a keyboard, mouse, pen-stylus, microphone, touch sensitive display screen, or any other activation or input mechanism known in the art. An output device 212 is capable of rendering information transmitted from the processor 202, or other component, such as a display monitor, printer, storage, etc.

The foregoing description of the preferred embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method for selecting a join order for tables subject to a join operation, comprising:

estimating join costs to perform joins on permutations of at least two of the tables, wherein each join permutation indicates an order of joining the tables;

determining whether sufficient computational resources are available to perform a cost analysis of further join permutations of the tables;

determining a restricted subset of remaining join permutations of at least two of the tables for which join costs have not been estimated that is less than all the remaining join permutations if sufficient computational resources are not available;

estimating join costs to perform joins on permutations of tables in the restricted subset; and using the estimated join costs to select one join permutation of all the tables having a lowest estimated cost.

2. The method of claim 1, wherein estimating the join costs to perform joins on permutations of the tables further comprises:

monitoring resources consumed when estimating the join costs to perform the joins;

reducing a remaining resource budget by the monitored resources consumed;

estimating future resources needed to analyze the join costs to perform joins on remaining join permutations; and determining whether the future resources exceed the remaining resource budget, wherein sufficient computational resources are not available if the estimated future resources exceed the remaining resource budget.

3. The method of claim 2, further comprising:

determining a factor by which the estimated future resources exceed the remaining resource budget, wherein the factor is used to determine the restricted subset.

4. The method of claim 2, wherein the join costs are estimated in iterations, and wherein monitoring resources and determining whether resources consumed exceeds the resource budget occur during each iteration.

5. The method of claim 1, wherein the join costs are estimated in iterations, further performing during each iteration following the first iteration:

determining join permutations formed by combining the join permutations considered in a previous iteration and the tables, wherein the join cost is considered with respect to the determined join permutations.

6. The method of claim 5, wherein determining the restricted subset during each iteration comprises:
selecting less than all of the join permutations considered in the previous iteration; and
using the selected join permutations considered in the previous iteration to form the determined join permutations.

7. The method of claim 6, further comprising:
determining a remaining resource budget available to estimate the join costs of further join permutations;
estimating future resources needed to estimate the join costs of further join permutations;
using the determined remaining resource budget and the estimated future resources to determine the less than all join permutations considered in the previous iteration to select.

8. The method of claim 1, wherein the join costs are estimated in iterations, and wherein during each iteration the join permutations subject to the join cost estimation are determined by:
considering i-way joins of the tables, where i is the iteration being performed, and wherein the estimated join cost comprises estimating the join cost of the considered i-way joins during the iterations.

9. The method of claim 8, wherein determining the restricted subset comprises:
selecting less than all of the (i−1)-way joins considered during the previous join to form i-way joins with the tables.

10. The method of claim 9, further comprising:
determining a remaining resource budget available to estimate the join costs of further join permutations;
estimating future resources needed to complete estimating the join costs in subsequent iterations; and
using the determined remaining resource budget and the estimated future resources to determine a number of the (i−1) join permutations considered in the previous iteration to select in forming the i-way join permutations.

11. The method of claim 9, wherein selecting less than all of the (i−1)-way joins further comprises:
determining a number of rows in each of the (i−1)-way joins considered during the previous join; and
selecting a subset of the (i−1)-way joins having the least number of rows to use in forming the i-way joins.

12. The method of claim 8, wherein using the estimated join costs to select one join permutation having the lowest estimated join cost comprises:
forming join permutations of all the tables from combinations of the i-way joins for which join costs were estimated during the iterations; and
for each formed join permutation of all the tables, summing the join costs for each i-way join that is a sub-join of the formed join permutation of all the tables to estimate the join costs for all the tables in the join permutation, wherein the join permutation of all the tables having the lowest estimated cost is selected.

13. The method of claim 1, further comprising:
generating a join combination data structure indicating the tables used in each permutation of tables for which join costs were estimated; and
generating a permutation data structure for each permutation of the tables indicated in each join combination data structure, wherein the estimated join costs to perform the joins for one permutation of at least two of the tables is included in the permutation data structure generated for that permutation.

14. A system for selecting a join order for tables subject to a join operation, comprising:
a computer readable medium;
a database implemented in the computer readable medium including a plurality of database tables;
means for estimating join costs to perform joins on permutations of at least two of the tables, wherein each join permutation indicates an order of joining the tables;
means for determining whether sufficient computational resources are available to perform a cost analysis of further join permutations of the tables;
means for determining a restricted subset of remaining join permutations of at least two of the tables for which join costs have not been estimated that is less than all the remaining join permutations if sufficient computational resources are not available;
means for estimating join costs to perform joins on permutations of tables in the restricted subset; and
means for using the estimated join costs to select one join permutation of all the tables having a lowest estimated cost.

15. The system of claim 14, wherein the means for estimating the join costs to perform joins on permutations of the tables further performs:
monitoring resources consumed when estimating the join costs to perform the joins;
reducing a remaining resource budget by the monitored resources consumed;
estimating future resources needed to analyze the join costs to perform joins on remaining join permutations; and
determining whether the future resources exceed the remaining resource budget, wherein sufficient computational resources are not available if the estimated future resources exceeds the remaining resource budget.

16. The system of claim 14, further comprising:
means for determining a factor by which the estimated future resources exceeds the remaining resource budget, wherein the factor is used to determine the restricted subset.

17. The system of claim 15, wherein the join costs are estimated in iterations, and wherein monitoring resources and determining whether resources consumed exceed the resource budget occur during each iteration.

18. The system of claim 14, wherein the join costs are estimated in iterations, further comprising means for performing during each iteration following the first iteration:
determining join permutations formed by combining the join permutations considered in a previous iteration and the tables, wherein the join cost is considered with respect to the determined join permutations.

19. The system of claim 18, wherein the means for determining the restricted subset during each iteration performs:
selecting less than all of the join permutations considered in the previous iteration; and
using the selected join permutations considered in the previous iteration to form the determined join permutations.

20. The system of claim 19, further comprising:
means for determining a remaining resource budget available to estimate the join costs of further join permutations;
means for estimating future resources needed to estimate the join costs of further join permutations;
means for using the determined remaining resource budget and the estimated future resources to determine the less than all join permutations considered in the previous iteration to select.

21. The system of claim 14, wherein the join costs are estimated in iterations, and wherein the means for estimating the join costs performs, during each iteration:
considering i-way joins of the tables, where i is the iteration being performed, and wherein the estimated join cost comprises estimating the join cost of the considered i-way joins during the iterations.

22. The system of claim 21, wherein the means for determining the restricted subset comprises:
selecting less than all of the (i–1)-way joins considered during the previous join to form i-way joins with the tables.

23. The system of claim 22, further comprising:
means for determining a remaining resource budget available to estimate the join costs of further join permutations;
means for estimating future resources needed to complete estimating the join costs in subsequent iterations; and
means for using the determined remaining resource budget and the estimated future resources to determine a number of the (i–1) join permutations considered in the previous iteration to select in forming the i-way join permutations.

24. The system of claim 23, wherein the means for selecting less than all of the (i–1)-way joins further performs:
determining a number of rows in each of the (i–1)-way joins considered during the previous join; and
selecting a subset of the (i–1)-way joins having the least number of rows to use in forming the i-way joins.

25. The system of claim 21, wherein the means for using the estimated join costs to select one join permutation having the lowest estimated join cost performs:
forming join permutations of all the tables from combinations of the i-way joins for which join costs were estimated during the iterations; and
for each formed join permutation of all the tables, summing the join costs for each i-way join that is a sub-join of the formed join permutation of all the tables to estimate the join costs for all the tables in the join permutation, wherein the join permutation of all the tables having the lowest estimated cost is selected.

26. The system of claim 14, further comprising:
means for generating a join combination data structure indicating the tables used in each permutation of tables for which join costs were estimated; and
means for generating a permutation data structure for each permutation of the tables indicated in each join combination data structure, wherein the estimated join costs to perform the joins for one permutation of at least two of the tables is included in the permutation data structure generated for that permutation.

27. An article of manufacture for selecting a join order for tables subject to a join operation, wherein the article of manufacture causes operations to be performed, the operations comprising:
estimating join costs to perform joins on permutations of at least two of the tables, wherein each join permutation indicates an order of joining the tables;
determining whether sufficient computational resources are available to perform a cost analysis of further join permutations of the tables;
determining a restricted subset of remaining join permutations of at least two of the tables for which join costs have not been estimated that is less than all the remaining join permutations if sufficient computational resources are not available;
estimating join costs to perform joins on permutations of tables in the restricted subset; and
using the estimated join costs to select one join permutation of all the tables having a lowest estimated cost.

28. The article of manufacture of claim 27, wherein estimating the join costs to perform joins on permutations of the tables further comprises:
monitoring resources consumed when estimating the join costs to perform the joins;
reducing a remaining resource budget by the monitored resources consumed;
estimating future resources needed to analyze the join costs to perform joins on remaining join permutations; and
determining whether the future resources exceed the remaining resource budget, wherein sufficient computational resources are not available if the estimated future resources exceeds the remaining resource budget.

29. The article of manufacture of claim 28, further comprising:
determining a factor by which the estimated future resources exceed the remaining resource budget, wherein the factor is used to determine the restricted subset.

30. The article of manufacture of claim 28, wherein the join costs are estimated in iterations, and wherein monitoring resources and determining whether resources consumed exceeds the resource budget occur during each iteration.

31. The article of manufacture of claim 27, wherein the join costs are estimated in iterations, further performing during each iteration following the first iteration:
determining join permutations formed by combining the join permutations considered in a previous iteration and the tables, wherein the join cost is considered with respect to the determined join permutations.

32. The article of manufacture of claim 31, wherein determining the restricted subset during each iteration comprises:
selecting less than all of the join permutations considered in the previous iteration; and
using the selected join permutations considered in the previous iteration to form the determined join permutations.

33. The article of manufacture of claim 32, further comprising:
determining a remaining resource budget available to estimate the join costs of further join permutations;
estimating future resources needed to estimate the join costs of further join permutations; and
using the determined remaining resource budget and the estimated future resources to determine the less than all join permutations considered in the previous iteration to select.

34. The article of manufacture of claim 27, wherein the join costs are estimated in iterations, and wherein during each iteration the join permutations subject to the join cost estimation are determined by:
- considering i-way joins of the tables, where i is the iteration being performed, and wherein the estimated join cost comprises estimating the join cost of the considered i-way joins during the iterations.

35. The article of manufacture of claim 34, wherein determining the restricted subset comprises:
- selecting less than all of the (i−1)-way joins considered during the previous join to form i-way joins with the tables.

36. The article of manufacture of claim 35, further comprising:
- determining a remaining resource budget available to estimate the join costs of further join permutations;
- estimating future resources needed to complete estimating the join costs in subsequent iterations; and
- using the determined remaining resource budget and the estimated future resources to determine a number of the (i−1) join permutations considered in the previous iteration to select in forming the i-way join permutations.

37. The article of manufacture of claim 35, wherein selecting less than all of the (i−1)-way joins further comprises:
- determining a number of rows in each of the (i−1)-way joins considered during the previous join; and
- selecting a subset of the (i−1)-way joins having the least number of rows to use in forming the i-way joins.

38. The article of manufacture of claim 34, wherein using the estimated join costs to select one join permutation having the lowest estimated join cost comprises:
- forming join permutations of all the tables from combinations of the i-way joins for which join costs were estimated during the iterations; and
- for each formed join permutation of all the tables, summing the join costs for each i-way join that is a sub-join of the formed join permutation of all the tables to estimate the join costs for all the tables in the join permutation, wherein the join permutation of all the tables having the lowest estimated cost is selected.

39. The article of manufacture of claim 27, further comprising:
- generating a join combination data structure indicating the tables used in each permutation of tables for which join costs were estimated; and
- generating a permutation data structure for each permutation of the tables indicated in each join combination data structure, wherein the estimated join costs to perform the joins for one permutation of at least two of the tables is included in the permutation data structure generated for that permutation.

* * * * *